United States Patent
Moustafa et al.

(10) Patent No.: US 10,791,177 B2
(45) Date of Patent: Sep. 29, 2020

(54) SYSTEM TO MONITOR AND CONTROL SENSOR DEVICES

(71) Applicant: Intel Corporation, Santa Clara, CA (US)

(72) Inventors: Hassnaa Moustafa, Portland, OR (US); Eve M. Schooler, Portola Valley, CA (US); Gang Shen, Hillsboro, OR (US); Tianyou Li, Shanghai (CN)

(73) Assignee: Intel Corporation, Santa Clara, CA (US)

(*) Notice: Subject to any disclaimer, the term of this patent is extended or adjusted under 35 U.S.C. 154(b) by 54 days.

(21) Appl. No.: 15/779,028

(22) PCT Filed: Dec. 24, 2015

(86) PCT No.: PCT/CN2015/098636
§ 371 (c)(1),
(2) Date: May 24, 2018

(87) PCT Pub. No.: WO2017/107119
PCT Pub. Date: Jun. 29, 2017

(65) Prior Publication Data
US 2018/0367617 A1    Dec. 20, 2018

(51) Int. Cl.
*H04L 29/08* (2006.01)
*H04L 12/26* (2006.01)
(Continued)

(52) U.S. Cl.
CPC ............ *H04L 67/125* (2013.01); *H04L 43/04* (2013.01); *H04L 65/102* (2013.01); *H04L 67/00* (2013.01);
(Continued)

(58) Field of Classification Search
CPC ....... H04L 67/322; H04L 67/02; H04L 67/12; H04L 69/18; H04L 63/126; H04L 63/08;
(Continued)

(56) References Cited

U.S. PATENT DOCUMENTS

| | | | |
|---|---|---|---|
| 2008/0064395 A1 | 3/2008 | Sibileau | |
| 2012/0197911 A1* | 8/2012 | Banka | H04L 67/12 707/752 |

(Continued)

FOREIGN PATENT DOCUMENTS

| | | |
|---|---|---|
| CN | 101808025 A | 8/2010 |
| CN | 102281251 A | 12/2011 |

(Continued)

OTHER PUBLICATIONS

International Preliminary Report on Patentability received on International Application No. PCT/CN2015/098636 dated Sep. 22, 2016, 4 pages.

(Continued)

*Primary Examiner* — Jungwon Chang
(74) *Attorney, Agent, or Firm* — Schwegman Lundberg & Woessner, P.A.

(57) ABSTRACT

A system to monitor and control sensor devices. A system in an operational environment may act as a gateway for at least one sensor device in the operational environment. In acting as a gateway the system may provide presentation data regarding the at least one sensor device to, and may receive commands from, at least one client device. Interaction between the gateway device and the at least one client device may be configured through interaction with access coordination resources (ACR). In push mode the gateway device may generate a notification when sensor data is determined to satisfy a condition. In pull mode the gateway system may receive commands from the at least one client device to cause the gateway system to generate/provide the presentation data to the at least one client device, provide instructions and/or data to the at least one sensor device, etc.

25 Claims, 8 Drawing Sheets

(51) Int. Cl.
*H04L 29/06* (2006.01)
*H04W 4/38* (2018.01)
*H04W 4/70* (2018.01)

(52) U.S. Cl.
CPC .............. *H04L 67/12* (2013.01); *H04L 69/08* (2013.01); *H04W 4/38* (2018.02); *H04W 4/70* (2018.02)

(58) Field of Classification Search
CPC ....... H04L 67/125; H04L 67/00; H04L 43/04; H04L 65/102; H04L 69/08; G06F 9/45558; H04W 4/38; H04W 4/70
See application file for complete search history.

(56) References Cited

U.S. PATENT DOCUMENTS

| | | | |
|---|---|---|---|
| 2014/0259114 A1* | 9/2014 | Jankowski | H04L 63/08 726/4 |
| 2015/0074259 A1* | 3/2015 | Ansari | H04L 67/02 709/224 |
| 2016/0036918 A1* | 2/2016 | Lee | H04L 67/322 370/230 |
| 2017/0111373 A1* | 4/2017 | Morton | H04L 63/126 |
| 2017/0134536 A1* | 5/2017 | Tessiore | H04L 69/18 |
| 2018/0246768 A1* | 8/2018 | Palermo | G06F 9/45558 |

FOREIGN PATENT DOCUMENTS

| | | |
|---|---|---|
| CN | 103595601 A | 2/2014 |
| WO | 2004081713 A2 | 9/2004 |
| WO | 2015114685 A1 | 8/2015 |

OTHER PUBLICATIONS

International Search Report received on International Application No. PCT/CN20150/98636 dated Sep. 22, 2016, 7 pages.
Supplementary European Search Report received in European Patent Application No. 15911118.6, dated Jul. 16, 2019, 4 pages.

* cited by examiner

Example Push Mode Operation 700

SYSTEM TO MONITOR AND CONTROL SENSOR DEVICES

CROSS-REFERENCE TO RELATED APPLICATIONS

This present application is a National Phase Application Filed Under 35 U.S.C. 371 claiming priority to PCT/CN2015/098636 filed Dec. 24, 2015, the entire disclosure of which is incorporated herein by reference.

TECHNICAL FIELD

This disclosure relates to gateway systems, and more particularly, to a system situated at the edge of an operational space to allow for the remote monitoring and control of devices.

BACKGROUND

As technology continues to advance, electronics are finding their way into previously un-imagined applications. The scope of electronic integration is now expanding into areas where electronic communication was not previously contemplated. Automobiles inform their owners via electronic communication when service is necessary, appliances inform their owners when failures occur or provide efficiency information to their manufacturers, smart meters inform the utility company of usage patterns and misconfiguration problems, etc. All of these "smart" apparatuses are forming what has been referred to as an "Internet of Things" (IoT), wherein common devices and/or systems now have the ability to communicate about status or errors, to receive remote commands, configurations, updates, etc. With the billions of IoT devices connected to the network, a huge amount of sensor data (e.g., sensor status updates) is generated, which is managed most of the time by a third party backend "cloud."

Most of the above communication occurs via wired or wireless links to the Internet. Currently devices include network capabilities that couple them into the Internet through a local wireless access point (AP) or a wired router. Some devices like web-enabled video capture equipment (e.g., web-based security cameras) or network cameras (also known as IP cameras) are not optimized to regulate Internet traffic, and may deliver a substantial amount of data (e.g., video capture feeds) directly onto the Internet constantly to enable either a user or a third party (e.g., a security company) to view the video data anytime.

While this activity appears beneficial, a consequence of the expansion of IoT is an anticipated increase in Internet traffic. The large amount of video data being piped into the Internet becomes problematic as the number of IoT devices grows. Additionally the video feed will be accompanied by apparatus status data, error data, configuration data, command data, etc., and the existing Internet infrastructure may not be able to handle it. For example, the current IoT market analysis forecasts for 2020 that 40% of all data will come from IoT devices and sensors—nearly reaching 90% of the data created in the world data created in last few years (Cisco Consulting Services, 2014). It is predicted that a total of 129 yottabytes will be generated, of which 41% will come from sensors and 59% from cameras (ABI Research, April 2015). Compounding these predicted traffic problems due to the immense increase in data generation, any data that is communicated across the Internet, stored in a remote online repository such as in a cloud architecture (e.g., at least one data storage server) is vulnerable to attackers, malware or other unauthorized users who may seek to access the data. From the user's (e.g., data owner's) perspective, privacy cannot be ensured for Cloud-stored content.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
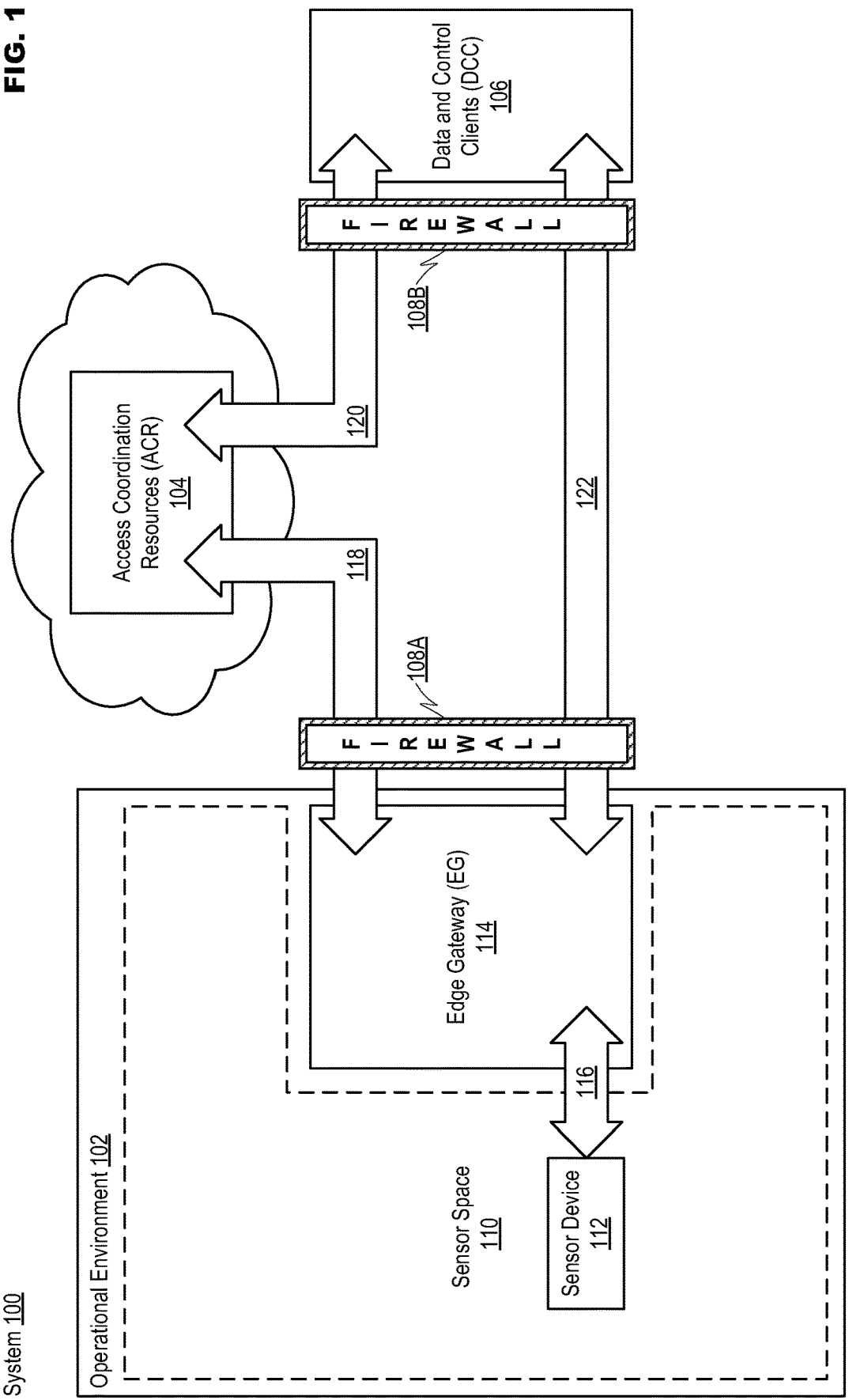
FIG. 1 illustrates an example system to manage sensor devices in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The current situation regarding the growth of IoT devices motivates moving storage and computational resources closer to the edge of an IoT network. This approach may save network resources, improve real-time data processing and analytics (e.g., by eliminating the network bottleneck) and enable the enforcement of security, privacy and access control rules. Furthermore, storage and computational resources at the network's edge may be improved by the ever increasing compute capabilities in data processing and communication devices, the continuous drop in storage device costs, etc.

The present disclosure is directed to a system to monitor and control sensor devices. A system in an operational environment may act as a gateway for at least one sensor device in the operational environment. For example, when acting as a gateway the system may provide presentation data regarding the at least one sensor device to, and receive commands regarding the at least one sensor device from, at least one client device. This interaction may be configured through interaction with access coordination resources (ACR). The gateway system may operate in push mode or pull mode. When operating in push mode, intelligence circuitry in the gateway system may determine if real-time sensor data satisfies a condition. When the real-time sensor data is determined to satisfy the condition, the intelligence circuitry may cause a notification to be generated. The gateway system may also store at least a portion of the real-time sensor data as stored sensor data (e.g., in at least one of a semantic or event-based manner), may protect the stored sensor data, etc. In pull mode the gateway system may interact with at least the ACR to establish a link between the gateway device and the at least one client. Commands may be received from the at least one client device to, for example, request data, control the at least one sensor device, etc. If a command requests data from the gateway system, presentation data may be generated using at least one of the real-time sensor data or the stored sensor data (e.g., also possibly in at least one of a semantic or event-based manner) and transmitted to the at least one client device. A determination may further be made as to whether the intended target for the command is the at least one sensor device. Instructions and/or data based on the command may be transmitted to the at least one target device when the intended target of the command is determined to be the at least one sensor device.

In at least one embodiment, an example gateway system may comprise at least interface circuitry, intelligence circuitry, remote link circuitry and core circuitry. The interface circuitry may be to facilitate interaction with at least one sensor device residing in an operational environment in which the gateway system also resides. The intelligence circuitry may be to analyze real-time sensor data received from the at least one sensor device via the interface circuitry. The remote link circuitry may be to facilitate interaction with at least one client device. The core circuitry may be to control at least the interface circuitry, the intelligence circuitry and the communication circuitry.

In at least one embodiment, example interface circuitry may comprise monitor circuitry to request the real-time sensor data from the at least one sensor device, access interface circuitry to access the at least one sensor device via a standard file system and conversion circuitry to convert an inbound communication formulated based on a first protocol used by the at least one sensor device to a second protocol used by the gateway system, and convert an outbound communication formulated based on the second protocol into the first protocol. Example intelligence circuitry may comprise analytics circuitry to, when the gateway system is operating in a push mode, determine if the real-time sensor data satisfies a condition and alert generation circuitry to trigger generation of at least one notification when the real-time sensor data is determined to satisfy the condition. Example remote link circuitry may comprise access coordination resource agent circuitry to interact with access coordination resources that coordinate communications between the gateway system and the at least one client device.

In at least one embodiment, the core circuitry may comprise storage circuitry to store at least a portion of the real-time sensor data as stored sensor data. The storage circuitry may be to store the real-time sensor data in at least one of a semantic or event-based manner. The remote link circuitry may comprise media presentation agent circuitry to cause presentation data to be generated based on at least one of the real-time sensor data or the stored sensor data, and to cause the presentation data to be transmitted to the at least one client device. For example, the presentation data may be generated based on at least a portion of the stored sensor data selected in at least one of a semantic or event-based manner. The core circuitry may comprise control and security circuitry to at least protect the stored sensor data. The remote link circuitry may comprise remote control agent circuitry to receive a command from the at least one client device. In at least one example implementation, the remote control agent circuitry may be to determine a target for the command, and the interface circuitry is to transmit at least one of instructions or data based on the command to the at least one sensor device when the at least one sensor device is determined to be the target.

Consistent with the present disclosure, an example system for controlling sensor devices may comprise at least one sensor device in an environment, wherein the at least one sensor device is to generate real time sensor data about a monitored system or the environment, at least one client device to receive presentation data, present the presentation data, support user interaction based on the presentation data and generate commands, access coordination resources including at least one device and at least one gateway device in the environment, wherein the at least one gateway device is to interact with the at least one sensor device to receive the real time sensor data and transmit at least one of instructions or data based on the commands, interact with the access coordination resources to transmit a notification regarding the sensor data and negotiate a link with the at least one client device, interact with the at least one client device through the negotiated link to transmit the presentation data and receive the commands. The at least one gateway device may be to store real time sensor data as stored sensor data and select at least one of the real time sensor data or the stored sensor data to generate the presentation data in at least one of a semantic or event-based manner Consistent with the present disclosure, an example method for operating a gateway device may comprise receiving real-time sensor data in at least one gateway device from at least one sensor device, determining whether the at least one gateway device is to operate in push mode, causing the at least one gateway device to analyze the real-time sensor data from at least one sensor device if it is determined that the gateway device is to operate in push mode, determining whether the at least one gateway device has received a request from the at least one client device to operate in pull mode and causing the at least one gateway device to negotiate a link to the at least one client device utilizing access coordination resources and initiate pull mode operation with the at least one client device if it is determined that the gateway device has received the request.

FIG. 1 illustrates an example system to manage IoT devices in accordance with at least one embodiment of the present disclosure. In describing embodiments consistent with the present disclosure, reference may be made to particular technologies such as, for example, IoT devices such as RealSense™-enabled devices from the Intel Corporation, communication protocols such as the Real Time Streaming Protocol (RTSP) standardized by the Multiparty Multimedia Session Control Working Group (MMUSIC WG) of the Internet Engineering Task Force (IETF), Web Real-Time Communications (WebRTC) developed by the World Wide Web Consortium (W3C), the Alljoyn® framework developed by the AllSeen Alliance, standards being proposed by the Open Internet Consortium (OIC), etc. These examples have been utilized to provide a readily comprehensible perspective for understanding the disclosed embodiments, and are not intended to limit implementations to only using these technologies. Discussions of protocols and/or standards within the present disclosure are exemplary, and may be applicable to other related or unrelated versions, parts or sub-parts of the protocol and/or standard including, for example, past and future versions of the same or related protocol(s) and/or standard(s) and/or other protocols and/or standards. Moreover, the inclusion of an apostrophe after an item number illustrated in a drawing figure (e.g., 100') is to indicate that an example embodiment corresponding to the item number is being shown. These example embodiments are not intended to limit the disclosure to only what is shown, and are presented merely for the sake of explanation. As referenced herein, IoT devices may generally include apparatuses or systems that do not operate primarily as data processors (e.g., devices including electronic circuitry that may perform data processing but excluding desktops, laptops, tablets, smart phones, etc.) capable of communicating via the Internet. The term "smart" preceding a device may generally indicate that the device is an IoT device. Examples of IoT devices include, but are not limited to, smart apparatuses such as home appliances, heating, ventilation and air conditioning (HVAC) equipment, office equipment, manufacturing equipment, smart vehicles and systems employed within vehicles, smart video capture equipment such as cameras (e.g., security cameras, stand-alone cameras based on RealSense™ depth sensing technology, etc.), smart environmental monitors such as thermometers, smoke detectors, security/motion/intrusion detectors, leak detectors, everyday objects and/or wearable items that include resources to collect and/or exchange data, etc. In addition, sensor data may be also referred to as "real-time" sensor data to emphasize that it was recently received from a sensor device. As a result, all sensor data may be considered real-time sensor data unless specifically indicated otherwise (e.g., such as "stored" sensor data, which may be real-time sensor data that was then stored within storage circuitry).

System 100 may comprise, for example, operational environment 102, ACR 104 and data and control clients (DCC) 106. At least operational environment 102 and DCC 106 may be protected by firewalls 108A and 108B. In at least one embodiment, firewalls 108A and 108B may be network address translation (NAT) firewalls. NAT firewalls may block packets having headers that do not comprise address information corresponding to the local network (e.g., not responsive to transmissions sent from the local network). Embodiments consistent with the present disclosure may function with NAT firewalls because interaction occurring between operational environment 102, ACR 104 and DCC 166 may essentially comprise responsive interaction, and thus, firewalls 108A and 108B may allow the packets.

Operational environment 102 may be a physical area (e.g., a bounded or unbounded outside environment such as a sports field, a structure such as a building or home, a portion of the structure such as a room, a vehicle, etc.), an electronically-defined area (e.g., an area within a wired network, within signal range of a wireless AP, etc.), etc. Sensor space 110 may comprise at least one sensor device 112. Sensor space 110 may be a physically-defined or electronically defined area within operational environment 102 in which sensor device 112 operates. Sensor device 112 may be, for example, an IoT (e.g., smart) device or other device comprising some sensing capability. Sensing capabilities may include, for example, sensing temperature, illumination (e.g., light/dark), motion (e.g., direction, speed, acceleration, etc.), the presence of an object, the proximity to an object, visual data (e.g., images and/or video), integrity (e.g., contact sensors to monitor window and/or door opening sensors), power (e.g., voltage, current, consumption, efficiency, etc.), etc. Operational environment 102 may also comprise edge gateway (EG) 114. EG 114 may comprise only one device, as illustrated in FIG. 1, or may comprise more than one device configured to provide the same or different functionality while operating in a collaborative manner EG 114 may operate on the edge between sensor space 110 and remotely located resources accessible via a global area network (GAN), a wide area network (WAN) like the Internet, a local area network (LAN), etc. EG 114 may, in general, serve to coordinate and support the operation of at least one sensor device 112 operating in sensor space 110. In performing this function, EG 114 may, for example, receive sensor data from at least one sensor device 112, may analyze the sensor data, may perform at least one activity based on the analysis of the sensor data, may store at least a portion of the sensor data, may interact with ACR 104 in the management of the at least one sensor device 112 and to establish links to DCC 106, etc. In at least one embodiment, only a portion of the sensor data may be stored to conserve storage capacity in EG 114. For example, EG 114 may analyze the sensor data received from at least one sensor device 112 to determine if a condition has been satisfied (e.g., if a contact sensor in a security system senses that a window was opened). When the condition is determined to have been satisfied, only the sensor data captured at the time when the condition was determined to have been satisfied (e.g., e.g., visual capture data from a security camera focused on an area of the breached window captured immediately before, during and for a certain duration after) may be stored. In example at least one implementation, the storage may be required to store video data. The stored video data may then later be recalled by consumers (e.g., applications) that may need to monitor the video. Example scenarios where this type of operation may occur include, but are not limited to, manufacturing environments where only authorized persons are allowed to be present at certain times of the day, a domicile where video can be reviewed to see what happened when a resident was away (e.g., at work, on vacation, etc.), etc.

Various benefits may be realized through the above type of operation. For example, localizing control and operation of sensor devices 112 operating within sensor space 110 may reduce the amount of Internet traffic from and to operational environment 102. The Internet infrastructure may become more taxed as more users go online, more devices become smart, etc. This may result in data rate limiting, capped data plans with overage charges and simply poor performance which may negatively impact user experience. EG 114 may help alleviate these problems by altering the traditional model wherein all data is transmitted to the Internet (e.g., to cloud resources, to requesting users, etc.) indiscriminately. Moreover, EG 114 may store sensor and other data locally, and may only release the data that is needed by ACR 104, the data that is requested by DCC 106. As a result, sensor data may be protected (e.g., behind NAT firewall 108A) instead of transmitted to, for example, a cloud storage resource that may be more vulnerable to hackers, malware, etc.

ACR 104 may comprise at least one device (e.g., a server) accessible through a GAN, WAN, LAN, etc. ACR 104 may generally control certain aspects of EG 114 and may further facilitate interaction between EG 114 and DCC 106. In facilitating the interaction, ACR 104 may comprise at least one server configured with a communication protocol that supports the delivery of data (e.g., multimedia data) from EG 114 to DCC 106 such as, for example, the WebRTC protocol. The communication protocol may further receive commands from DCC 106 for delivery to EG 114, and possibly for delivery on to sensor device 112 to affect change in the operation of sensor device 112.

DCC 106 may include at least one device. Devices acting as DCC 106 may generally consume data provided from EG 114, may generate commands for controlling EG 114 and/or at least one sensor device 112, etc. For example, an application executed in a DCC 106 may present data to a user and provide a user interface to the user to facilitate control over EG 114 and/or sensor device 112. In this regard, the application may cause a device to interact with ACR 104 to establish communication with at least EG 114, may cause the device to receive data for presentation on the device from EG 114, and in some cases may cause the device to transmit commands to EG 114 to, for example, configure the operation of at least one sensor device 112. Examples of devices that may act as a DCC 106 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Examples of interaction are illustrated in FIG. 1 to demonstrate how the components making up system 100 may collaborate. At least one sensor device 112 may interact with EG 114 as shown at 116 to, for example, provide sensor data to EG 114 and receive instructions and/or data from EG 114. EG 114 may also interact with ACR 104 as shown at 118 to, for example, transmit notifications to DCC 106, to negotiate link 122 with DCC 106 over which presentation data may be transmitted, to receive configuration, instructions, etc. from ACR 104, etc. Presentation data, as referenced herein, may comprise any data that may be sent to DCC 106 for presentation to a user including, but not limited to, visual data including text, images, video, etc., sound data such as audio recordings made in operational environment 102, haptic data to generate tactile feedback, etc. Presentation data may be generated based on sensor data generated by at least one sensor 112 and/or sensor data previously stored in EG 114 (e.g., "stored sensor data"). DCC 106 may interact with ACR 104 as shown at 120 to, for example, receive a notification generated by EG 114, to negotiate link 122 with EG 114 to receive presentation data and/or transmit commands Link 122 may be a direct connection between EG 114 and DCC 106 over which presentation data may be sent for presentation by DCC 106 and/or commands may be received to control EG 114 and/or sensor device 112.

Figure 2:
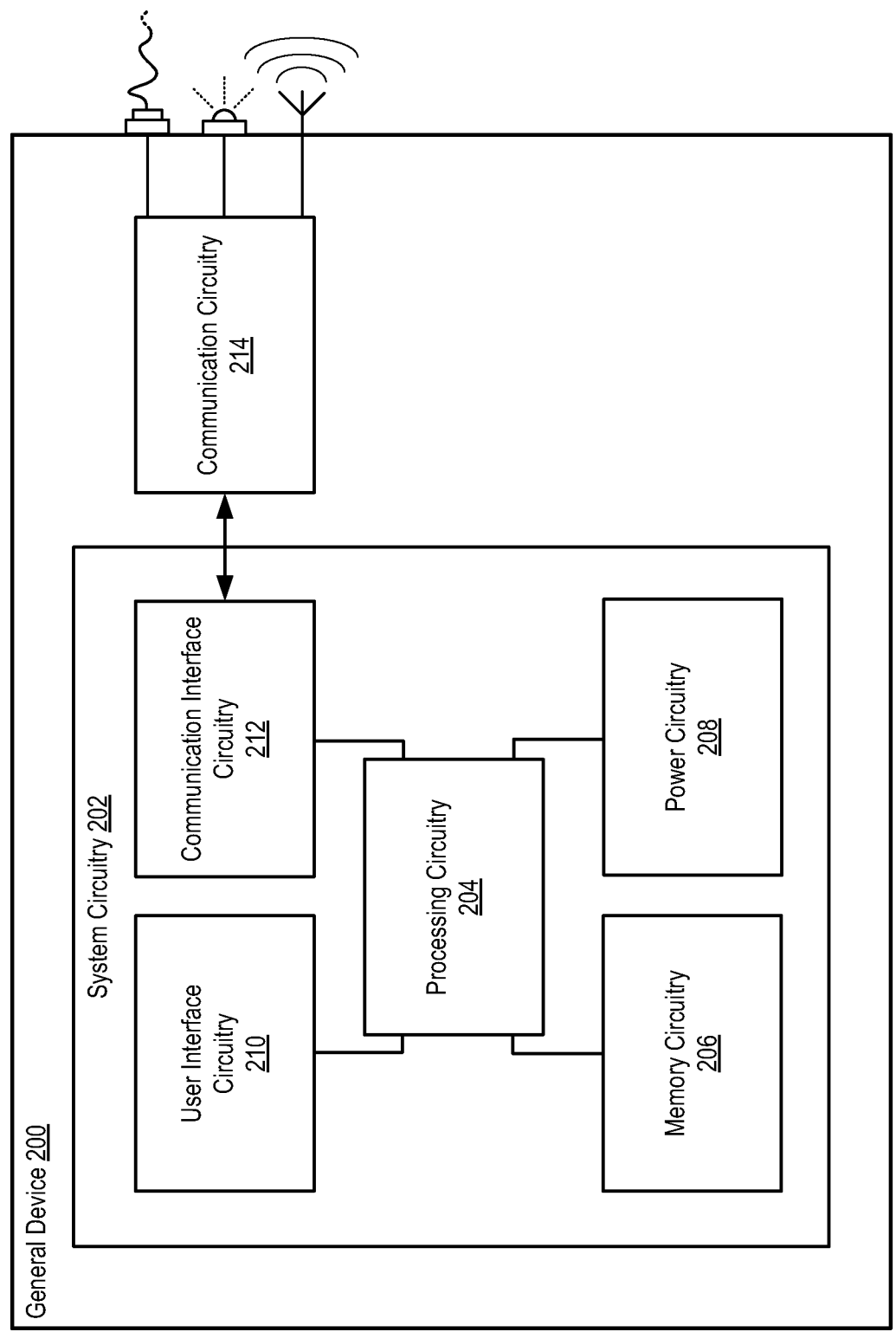
FIG. 2 illustrates an example configuration for a device usable in accordance with at least one embodiment of the present disclosure.

FIG. 2 illustrates an example configuration for a device usable in accordance with at least one embodiment of the present disclosure. General device 200 may be able to perform any or all of the activities shown in FIG. 1. However, general device 200 is presented only as an example of an apparatus usable in embodiments consistent with the present disclosure, and is not intended to limit any of the embodiments to a particular manner of implementation.

System circuitry 202 may manage the operation of general device 200. System circuitry 202 may include, for example, processing circuitry 204, memory circuitry 206, power circuitry 208, user interface circuitry 210 and communication interface circuitry 212. General device 200 may also comprise communication circuitry 214. While communication circuitry 214 is shown as separate from system circuitry 202, the example illustrated in FIG. 2 is provided merely for the sake of explanation. Some or all of the functionality associated with communication circuitry 214 may be incorporated into system circuitry 202.

In general device 200, processing circuitry 204 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 204 may interact with other system components that may be operating at different speeds, on different buses, etc. in general device 200. Moreover, some or all of the functionality commonly associated with the support circuitry may also be included in the same physical package as the processor (e.g., such as in the Sandy Bridge, Broadwell and Skylake families of processors available from the Intel Corporation).

Processing circuitry 204 may be configured to execute various instructions in general device 200. Instructions may include program code configured to cause processing circuitry 204 to perform activities related to reading data, writing data, processing data, formulating data, converting data, transforming data, etc. Information (e.g., instructions, data, etc.) may be stored in memory circuitry 206. Memory circuitry 206 may comprise random access memory (RAM) and/or read-only memory (ROM) in a fixed or removable format. RAM may include volatile memory configured to hold information during the operation of general device 200 such as, for example, static RAM (SRAM) or Dynamic RAM (DRAM). ROM may include non-volatile (NV) memory circuitry configured based on BIOS, UEFI, etc. to provide instructions when general device 200 is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 208 may include, for example, internal power sources (e.g., a battery, fuel cell, etc.) and/or external power sources (e.g., electromechanical or solar generator, power grid, external fuel cell, etc.), and related circuitry configured to supply general device 200 with the power needed to operate. User interface circuitry 210 may include hardware and/or software to allow users to interact with general device 200 such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 210 may be incorporated within general device 200 and/or may be coupled to general device 200 via a wired or wireless communication medium. At least some user interface circuitry 210 may be optional in certain circumstances such as, for example, a situation wherein general device 200 is a very space-limited form factor device, a server (e.g., rack server or blade server), etc. that does not include user interface circuitry 210, and instead relies on another device (e.g., a management terminal) for user interface functionality.

Communication interface circuitry 212 may be configured to manage packet routing and other control functions for communication circuitry 214, which may include resources configured to support wired and/or wireless communications. In some instances, general device 200 may comprise more than one set of communication circuitry 214 (e.g., including separate physical interface circuitry for wired protocols and/or wireless radios) managed by centralized communication interface circuitry 212. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuitry 212 may be configured to prevent wireless communications that are active in communication circuitry 214 from interfering with each other. In performing this function, communication interface circuitry 212 may schedule activities for communication circuitry 214 based on, for example, the relative priority of messages awaiting transmission. While the embodiment disclosed in FIG. 2 illustrates communication interface circuitry 212 being separate from communication circuitry 214, it may also be possible for the functionality of communication interface circuitry 212 and communication circuitry 214 to be incorporated into the same circuitry.

Figure 3:
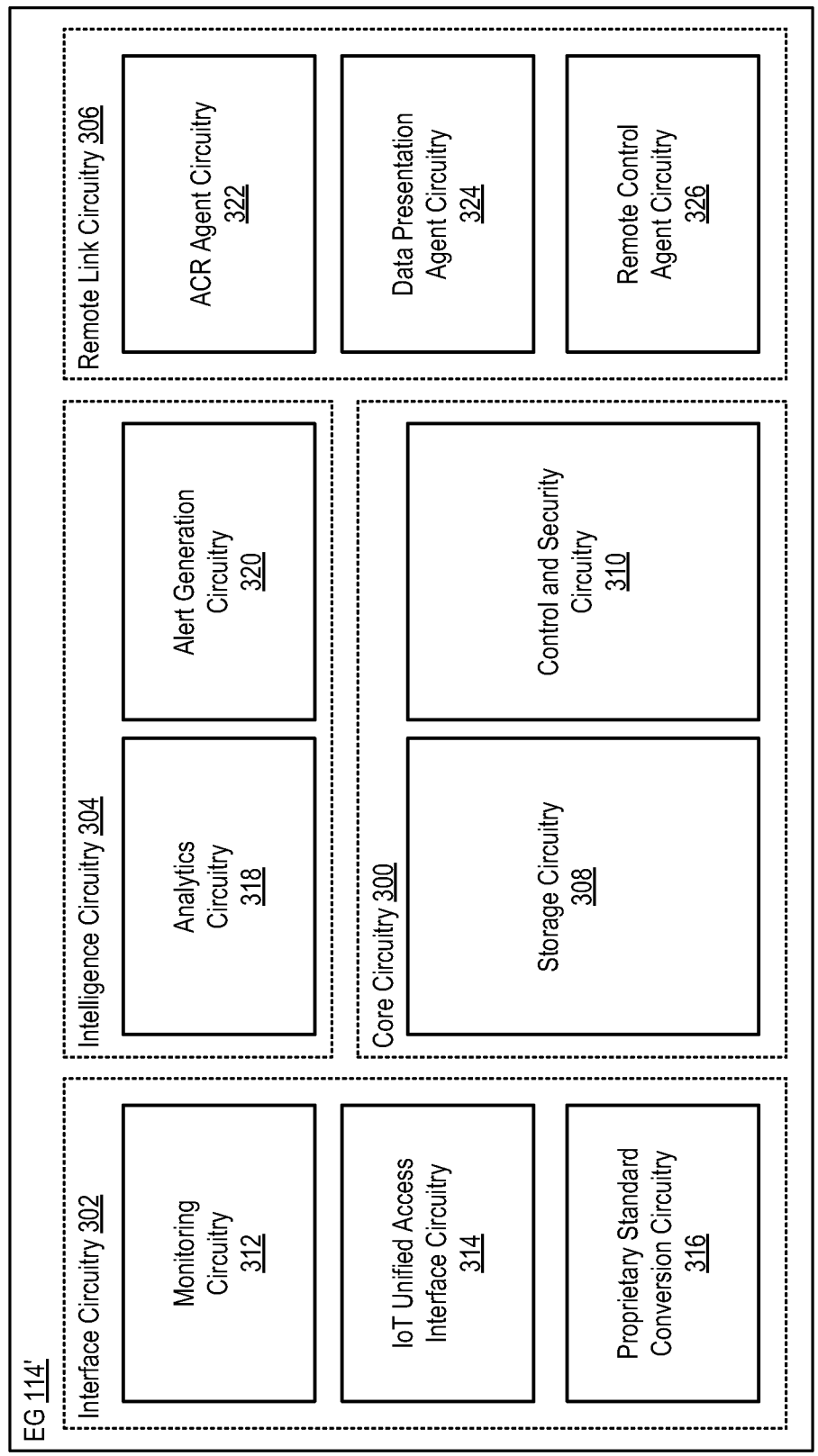
FIG. 3 illustrates an example configuration for a gateway device in accordance with at least one embodiment of the present disclosure.

Consistent with the present disclosure, sensor device 112, EG 114, firewalls 108A and 108B, and devices that may make up, or act as, ACR 104 and DCC 106 may be configured in a manner similar to general device 200. For example, sensor device 112 may, depending on the implementation, comprise a configuration that may include the features (e.g., or at least a subset of the features) described in regard to general device 200. Moreover, FIG. 3 illustrates functional aspects within EG 114. These functional aspects may correspond directly with the circuitry described in regard to general device 200, or may result when software such as, for example, an application, program, code module, etc. is executed by processing circuitry 204 to transform processing circuitry 204 from a general purpose data processing equipment into specialized circuitry able to perform at least one particular task as directed by the software.

FIG. 3 illustrates an example configuration for a gateway device in accordance with at least one embodiment of the present disclosure. EG 114' may comprise, for example, core circuitry 300, interface circuitry 302, intelligence circuitry 304 and remote link circuitry 306. Core circuitry 300 may be to control the overall operation of EG 114' and may include, for example, storage circuitry 308 and control and security circuitry 310. Storage circuitry 308 may include at least one storage device (e.g., an electromechanical and/or solid state storage device) to store at least a portion of sensor data received from at least one sensor device 112 via interface circuitry 302. Storage circuitry 308 may be fixed or removable. In at least one embodiment, storage circuitry 308 may extend beyond EG 114' to comprise, for example, at least one external storage device such as a local or networked server, an array of data storage devices (e.g., a redundant array of independent disks (RAID) array), a removable flash drive, etc. Real-time sensor data may be stored to storage circuitry 308 in various ways. In at least one embodiment, data may be stored in at least one of a semantic or event-based manner. In terms of storage, "semantic" may indicate that data identifiers (e.g., file names, folders, etc.) may be used to indicate characteristics of the corresponding stored sensor data. For example, the semantics may indicate time/date of data capture, location of capture, status at capture (e.g., that one or more conditions were satisfied to trigger the capture), etc. Semantics in video capture may also indicate, for example, the contents of the video capture (e.g., objects and people), etc. "Event-based" in terms of storage may indicate that only specific events may trigger when data is stored. For example, the same condition that triggers the issuance of a notification may also trigger the storage of real-time sensor data. Events may be determined by what sensor device 112 is monitoring (e.g., sensor space 110, an apparatus or system in which sensor device 112 is embedded, the operation of sensor device 112 itself, etc. These events may cause real-time data to be stored for an instant, for a certain duration after the occurrence of the event, until another event is detected (e.g., the opening and closing of a door may constitute two separate events that dictate the start and stop of data capture), etc.

Control and security circuitry 310 may generally manage interaction between circuitries 302, 304 and 306. For example, control and security circuitry may configure circuitries 302, 304 and 306, may control the passing of data between circuitries 302, 304 and 306, and may provide security to protect the data stored in storage circuitry 308. For example, security may be configured by an equipment and/or software manufacturer for EG 114', an administrator of EG 114', a user, etc. to control what data may be transmitted from EG 114'. The security in EG 114' may control what sensor data may be used to generate presentation data (e.g., the data transmitted from EG 114' to DCC 106 for presentation to a user), how much (e.g., what portions) of the sensor data may be presented, to whom the data may be presented, etc. For example, policy management may be enforced to provide different access rights (e.g., view, modify, local store, etc.) for different data (e.g., configuration data, statistical data, condition triggering data, actual real-time and/or stored sensor data, etc.). The data may also be modified prior to transmission. For example, if the sensor data comprises image or video capture, the faces of people in the image or video capture may be obscured (e.g., blurred) to prevent others from learning their identity, written or symbolic indicia (e.g., street signs, license plates, etc.) that may be used to identify people, places, etc. in the sensor data may be obscured, metadata (e.g., time, date, location, device ID, etc.) may be provided only to certain DCC 106, etc. Access to configure, update software/firmware, etc. in EG 114' and/or sensor devices 112 may also be restricted to certain users or other authorized parties.

Example interface circuitry 302 may comprise monitoring circuitry 312, IoT unified access circuitry 314 and proprietary standard conversion circuitry 316. Monitoring circuitry 312 may request sensor data from at least one sensor device 112. Requests for sensor data may be, for example, made on a periodic basis, on the occurrence of an event in EG 114' or at least one sensor device 112 (e.g., as determined by intelligence circuitry 304), in response to requests received in EG 114' from ACR 104 or DCC 106, etc. IoT unified access interface circuitry 314 may, for all sensor devices 112 that comprise a standard IoT file system existing now or in the future, be able to access and/or configure sensor devices 112 through their file system. For example, an access method may identify where particular data (e.g., sensor data, configuration data) may reside in a file system for sensor device 112, and IoT unified access interface circuitry 314 may be able to determine device status, perform device configuration, etc. by reading, altering, deleting, inserting, etc. data in the file system. Proprietary standard conversion circuitry 316 may be able to receive data transmitted utilizing a communication protocol not supported in EG 114' (e.g., AllJoyn®, a proprietary communication protocol such as used by an image capture device, a security system, a vehicular control system, etc.) and convert it to a communication protocol used by EG 114' such as a standard communication protocol proposed by the OIC. In this manner, a variety of sensor devices 112 may interact with, and thus be supported by, EG 114'.

Example intelligence circuitry 304 may comprise analytics circuitry 318 and alert generation circuitry 320. Analytics circuitry 318 may analyze sensor data received from at least one sensor device 112. Analyzing the sensor data may include, for example, tracking various statistics in the sensor data (e.g., looking for trends, logging highs and lows, logging changes, etc.). Consistent with the present disclosure, analytics circuitry 318 may determine if the sensor data has satisfied at least one condition. The condition may be, for example, an on/off determination, whether the sensor data has met or exceeded a certain threshold level, whether the sensor data may comprise certain readings, indications, types of data, etc. Upon determining that a condition has been satisfied, analytics circuitry 318 may then trigger alert generation circuitry 320 to generate a notification. For example, alert generation circuitry 320 may comprise a listing of conditions and corresponding notifications, a type/manner of notification, an identification of at least one DCC 106 to which each notification should be transmitted, etc. The notification may then be transmitted via remote link circuitry 306, and may include, for example, at least one signal to trigger activities in ACR 104 and/or DCC 106 (e.g., to alert a user of a situation regarding EG 114' or at least one sensor device interacting with EG 114'), a packet, a message (e.g., email, text message, etc.) to inform at least one user of DCC 106 that the condition has been met, etc. Upon receiving the notification, the user may initiate a link to EG 114' using ACR 104' so that presentation data may be received, a command may be issued, etc.

Example remote link circuitry 306 may comprise ACR agent circuitry 322, data presentation agent circuitry 324 and remote control agent circuitry 326. ACR agent circuitry 322 may support interaction between EG 114' and ACR 104. This interaction may include, for example, receiving configuration data from ACR 104, receiving information to negotiate a link between EG 114' and DCC 106, etc. Data presentation agent circuitry 324 may include resources in EG 114' to prepare and/or transmit presentation data to DCC 106. Presentation data may be real-time sensor data and/or stored sensor data that will be transmitted to the DCC, or may be new data generated based on sensor data and/or stored sensor data. In at least one embodiment, data presentation agent circuitry 324 may act alone, or in combination with other resources in EG 114' such as core circuitry 300, to prepare presentation data based on real-time data and/or stored sensor data. In at least one example implementation, the presentation data may be prepared in at least one of a semantic or event-based manner. For example, the stored sensor data that will be utilized to prepare the presentation data may be determined utilizing semantic criteria (e.g., from a certain sensor device, on a certain date/time, etc.). Moreover, event-based criteria may be employed alone or in combination with the semantic criteria to, for example, select only stored sensor data that was captured during certain events (e.g., video data that was captured only when certain events occurred, status data collected only when errors occurred, etc.). In an example embodiment where WebRTC is employed, data presentation agent circuitry 324 may comprise WebRTC agent software to configure EG 114' to transmit multimedia data (e.g., video capture generated by at least one sensor device 112) to DCC 106. Consistent with the present disclosure, Remote control agent circuitry 326 may include resources to receive commands from DCC 106. Again, this is a capability that is supported in the WebRTC client, and thus, may be used to receive and process commands from DCC 106. Commands may be directed to EG 114' or at least one sensor device 112. Examples of commands may include activation/deactivation, mode changes, enabling/disabling certain features, moving a device (e.g., for a camera, pan, tilt, zoom, etc.), investigating and clearing error codes, etc. EG 114' may receive commands from DCC 106 and may determine if the intended target for the command is itself or at least one sensor device 112. If at least one sensor device 112 is the intended target of the command, instructions and/or data based on the command may be generated and then transmitted to the at least one sensor device 112.

Figure 4:
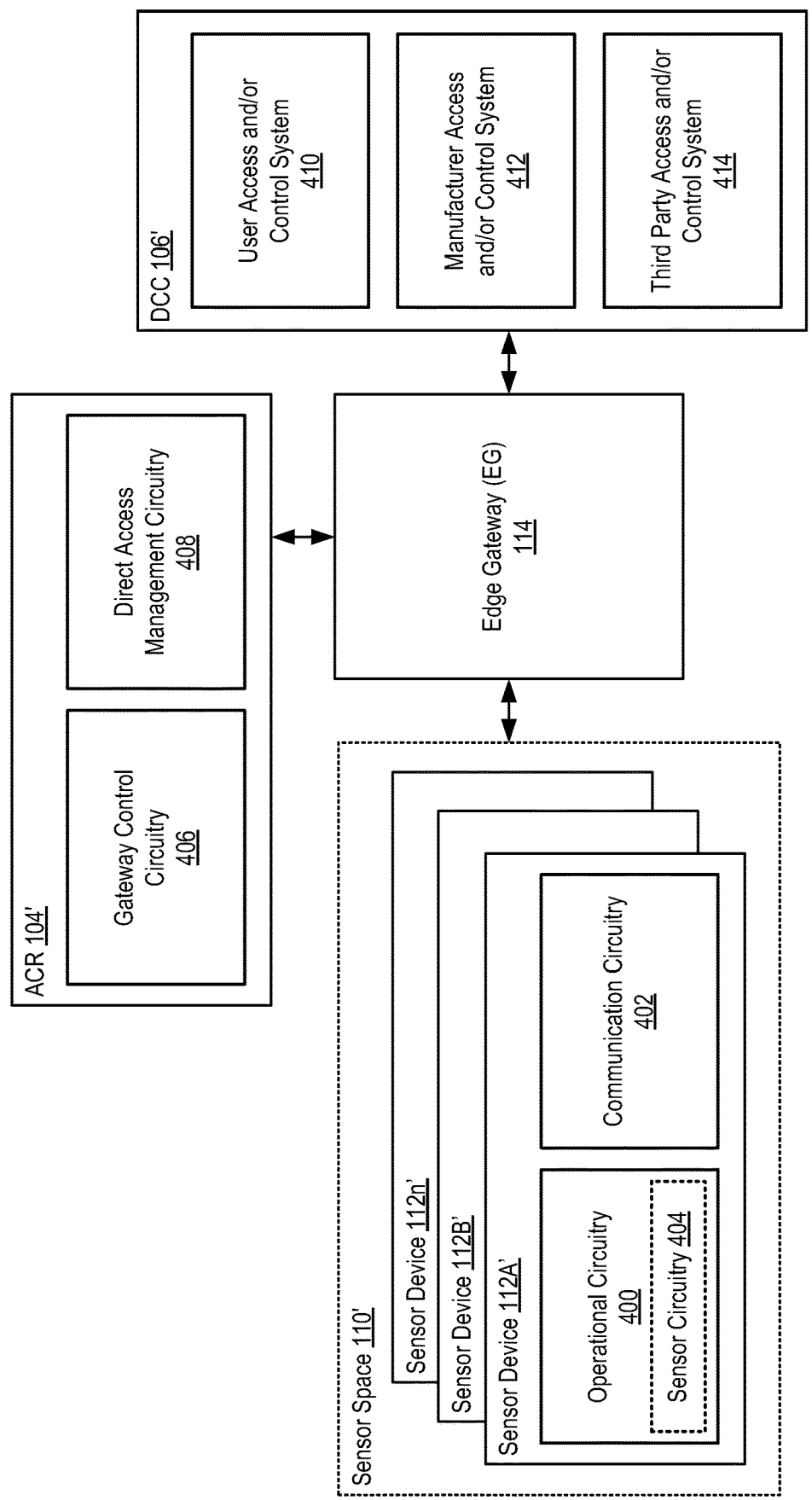
FIG. 4 illustrates example configurations for sensor devices, access coordination resources (ACR) and data and control clients (DCC) in accordance with at least one embodiment of the present disclosure.

FIG. 4 illustrates example configurations for sensor devices, an ACR and a DCC in accordance with at least one embodiment of the present disclosure. Example sensor devices 112A', 112B' . . . 112n' (collectively "sensor devices 112A . . . n') are shown in FIG. 4. Each sensor device 112A . . . n' may comprise at least operational circuitry 400 and communication circuitry 402. Operational circuitry 400 may perform at least limited data processing, may comprise a memory to store at least a rudimentary OS, etc. Communication circuitry 402 may comprise equipment needed for sensor devices 112A . . . n' to interact with at least EG 114 via wired or wireless communication. In at least one embodiment, operational circuitry 400 may also comprise sensor circuitry 404 to generate sensor data regarding sensor devices 112A ... n' (e.g., for self-sensing), regarding operational environment 102, etc. For example, sensor circuitry 404 in sensor device 112A' may monitor the status (e.g., readiness, activity, errors, etc.), power consumption, etc. of sensor device 112' and may monitor illumination, temperature, occupancy, fire and/or damage indicators, etc. in operational environment 102.

ACR 104' may comprise, in at least one embodiment, gateway control circuitry 406 and direct access management circuitry 408. Gateway control circuitry 406 may manage the operation of at least EG 114. One occurrence of gateway control circuitry 406 may manage the operation of more than one EG 114 (e.g., each EG 114 operating in a different operational environment 102). In at least one embodiment, gateway control circuitry 406 may also manage the operation of some or all sensor devices 112A ... n'. Managing the operation may include, for example, providing firmware/software updates to EG 114, providing access, configuration and control tools (e.g., user interfaces) to manufacturers, operators and users of EG 114, handling notifications from EG 114 (e.g., directing notifications to the appropriate DCC 106'), etc. Gateway control circuitry 406 may hand off responsibility for establishing a link for transmitting presentation data to, or receiving commands from, DCC 106' to direct access management circuitry 408. In an example implementation, direct access management circuitry 408 may be a WebRTC server. Direct access management circuitry 408 may assist in establishing a link between EG 114 and DCC 106', may offer resources (e.g., transcoding for different coder-decoders (codecs), etc.) to assist and/or expedite the delivery of real time data or stored sensor data (e.g., presentation data) that may be streamed from EG 114 to DCC 106', etc.

DCC 106' may comprise a device to present presentation data (e.g., to display text, images and/or video, generate audio, etc. based on the presentation data) received from EG 114, and to receive commands that may be intended (e.g., targeted) for EG 114 and/or at least one sensor device 112A ... n' coupled to EG 114. DCC 106' may comprise, for example, user access and/or control system 410, a manufacturer access and/or control system 412 and/or a third party access and/or control system 414. User access and/or control system 410 may be a user device (e.g., mobile device, tablet computer, laptop computer, desktop computer, etc.) configured to receive and present presentation data. WebRTC is a communication protocol that may allow for the presentation of real time data (e.g., video data) within a web browser. In an example implementation where WebRTC is employed, a browser may be configured to first access at least direct access management circuitry 408 in ACR 104' to be configured to interact with EG 114. For example, a simple user interface (e.g., coded in hypertext markup language 5 (HTML 5) may be downloaded into a web browser to provide a control interface for a user to select at least one sensor device 112A ... n' to access, select the presentation data to view, manipulate the presentation of the presentation data, transmit commands to EG 114 and/or sensor devices 112A ... n', etc. Manufacturer access and/or control system 412 may provide a portal through which a manufacturer of EG 114 and/or sensor devices 112A' ... n' may provide device updates, pursue corrective action, add additional functionality, etc. In a similar manner, third party access and/or control system 414 may provide access to a third party (e.g., an information technology company, a security company, etc.) to access EG 114 and/or sensor devices 112A ... n'. In at least one embodiment, the level of access granted to each of user access and/or control system 410, a manufacturer access and/or control system 412 and/or a third party access and/or control system 414 may be different. For example, users and third parties may be able to presentation data based on sensor data generated by sensor devices 112A ... n' but not to change the configuration of sensor devices 112A ... n', while manufacturers may have access to configure, update, install new functionality to, etc. sensor devices 112A ... n' but not to view the presentation data. A variety of different security configurations may be possible configurable via, for example, gateway control circuitry 406.

Figure 5:
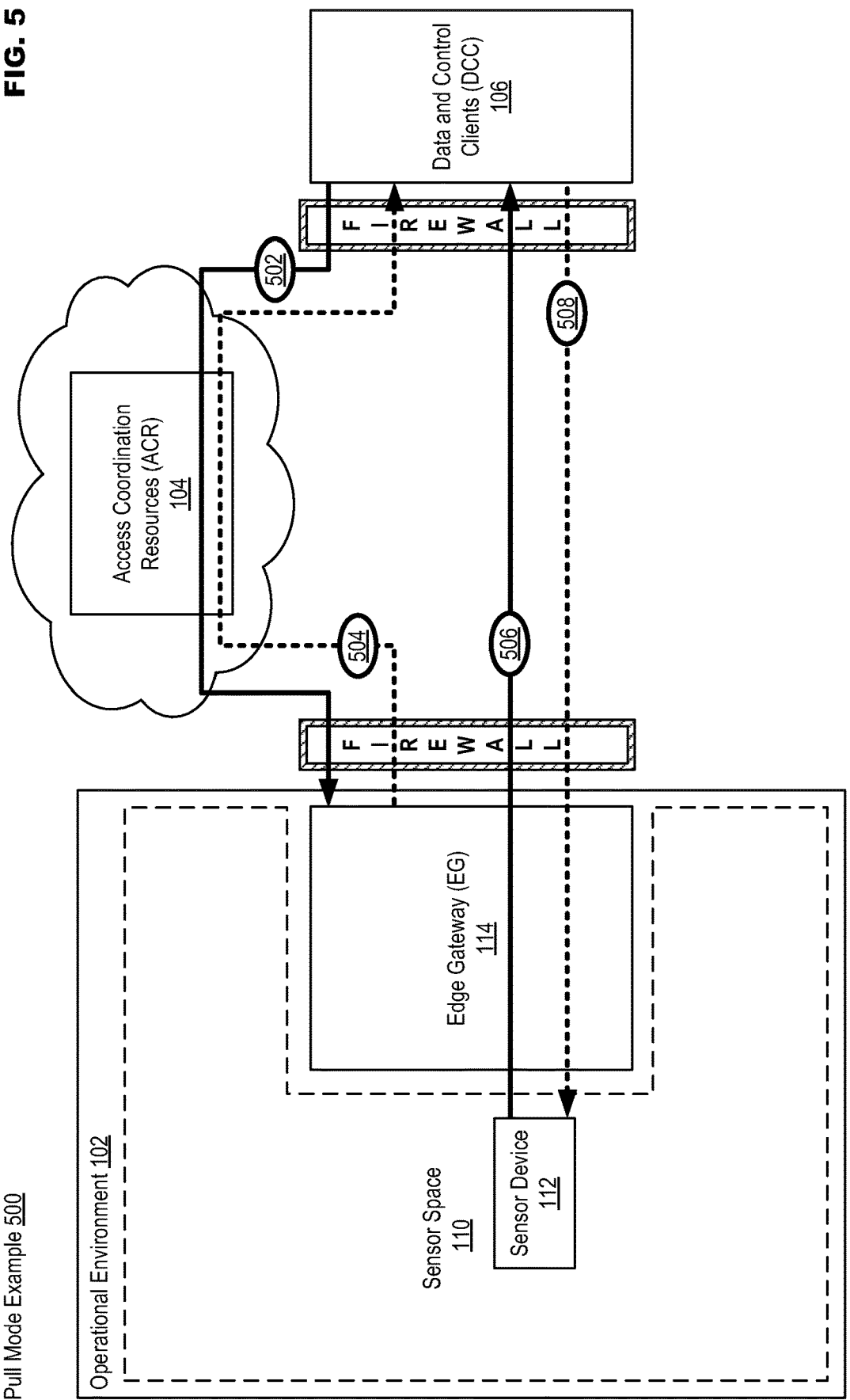
FIG. 5 illustrates an example of pull mode operations in accordance with at least one embodiment of the present disclosure.

FIG. 5 illustrates an example of pull mode operations in accordance with at least one embodiment of the present disclosure. In general, pull mode is initiated from DCC 106 in response to, for example, a user desiring to receive presentation data from at least one sensor device 112. In pull mode example 500 DCC 106 may initiate communication through ACR 104 as shown at 502. Initial communication 502 may include, for example, a login for DCC 106 into ACR 104 (e.g., possibly including user authentication to determine whether the user requesting access is authorized to access EG 114), a request identifying a particular EG 114 and/or sensor device 112 for which access is requested, etc. Initial communication 502 may cause ACR 104 to interact with EG 114 to initiate link establishment. In one embodiment, ACR 104 may simply pass initial communication 502 to a corresponding EG 114 (e.g., when ACR 104 is managing more than one EG 114). EG 114 may then respond as shown at 504 to confirm availability, readiness, security authorization of the user requesting access through DCC 106, etc. Responsive message 504 may be optional in that it may only be sent in some instances such as, for example, when EG 114 is only able to interact with one DCC 106 at a time, when there are a variety of users with different security that interact with EG 114, etc.

If the user of DCC 106 is authorized to access EG 114 and EG 114 is ready to accept access, then a direct link may be established between EG 114 and DCC 106. ACR 104 may manage this link to, for example, respond to user instructions regarding the playback of the presentation data, provide transcoding services, etc. The presentation data may be sent from EG 114 to DCC 106 (e.g., for presentation to the user) as shown at 506. In one embodiment, DCC 106 may be a view only terminal and/or the user of DCC 106 may only be authorized to view presentation data. However, if DCC 106 and/or the user of DCC 106 have the ability to issue commands to EG 114, then at least one command may be issued to EG 114 as shown at 508. Various resources in EG 114 (e.g., core circuitry 300, interface circuitry 302, etc.) may determine a target for the command. If the target is determined to be sensor device 112, then instructions and/or data based on the command may be forwarded to sensor device 112.

Figure 6:
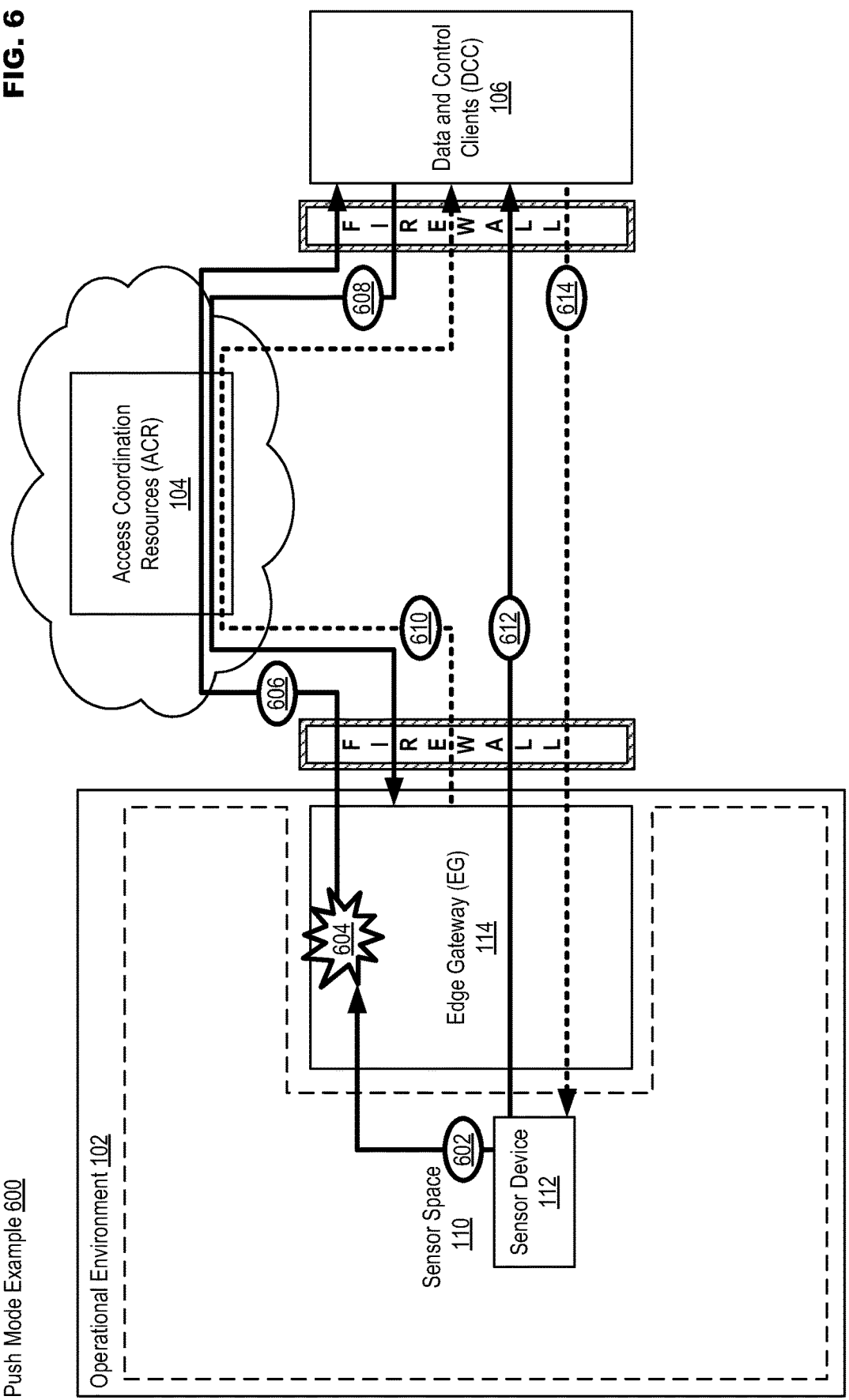
FIG. 6 illustrates an example of push mode operations in accordance with at least one embodiment of the present disclosure.

FIG. 6 illustrates an example of push mode operations in accordance with at least one embodiment of the present disclosure. In general, push mode operation is initiated by EG 114. For example, EG 114 may analyze sensor data received from at least one sensor device 112 as shown at 602, and when a certain condition is met may generate a notification to at least one DCC 106. In push mode example 600 sensor data may be received from at least one sensor device 112 and may be analyzed by EG 114 (e.g., by intelligence circuitry 304). Upon the occurrence of event 604 such as, for example, the sensor data satisfying a condition, EG 114 may generate a notification. In at least one embodiment, the notification may be sent through ACR 104 to DCC 106 as shown at 606. The remainder of push mode example 600 may follow similarly to pull mode 500. DCC 106 may then initiate communication through ACR 104 as shown at 608. Access request 608 may include, for example, a login for DCC 106 into ACR 104 (e.g., possibly including user authentication to determine whether the user requesting access is authorized to access EG 114), a request identifying a particular EG 114 and/or sensor device 112 for which access is requested, etc. Access request 608 may cause ACR 104 to interact with EG 114 to initiate link establishment. In one embodiment, ACR 104 may simply pass access request 608 to a corresponding EG 114 (e.g., when ACR 104 is managing more than one EG 114). EG 114 may then respond as shown at 610 to confirm availability, readiness, security authorization of the user requesting access through DCC 106, etc. Responsive message 610 may be optional in that it may only be sent in some instances such as, for example, when EG 114 is only able to interact with one DCC 106 at a time, when there are a variety of users with different security that interact with EG 114, etc.

If the user of DCC 106 is authorized to access EG 114 and EG 114 is ready to accept access, then a direct link may be established between EG 114 and DCC 106. ACR 104 may manage this link to, for example, respond to user instructions regarding the playback of the presentation data, provide transcoding services, etc. The presentation data may be sent from EG 114 to DCC 106 (e.g., for presentation to the user) as shown at 612. In one embodiment, DCC 106 may be a view only terminal and/or the user of DCC 106 may only be authorized to view presentation data. However, if DCC 106 and/or the user of DCC 106 have the ability to issue commands to EG 114, then at least one command may be issued to EG 114 as shown at 614. Various resources in EG 114 (e.g., core circuitry 300, interface circuitry 302, etc.) may determine a target for the command. If the target is determined to be sensor device 112, then instructions and/or data based on the command may be forwarded to sensor device 112.

Figure 7:
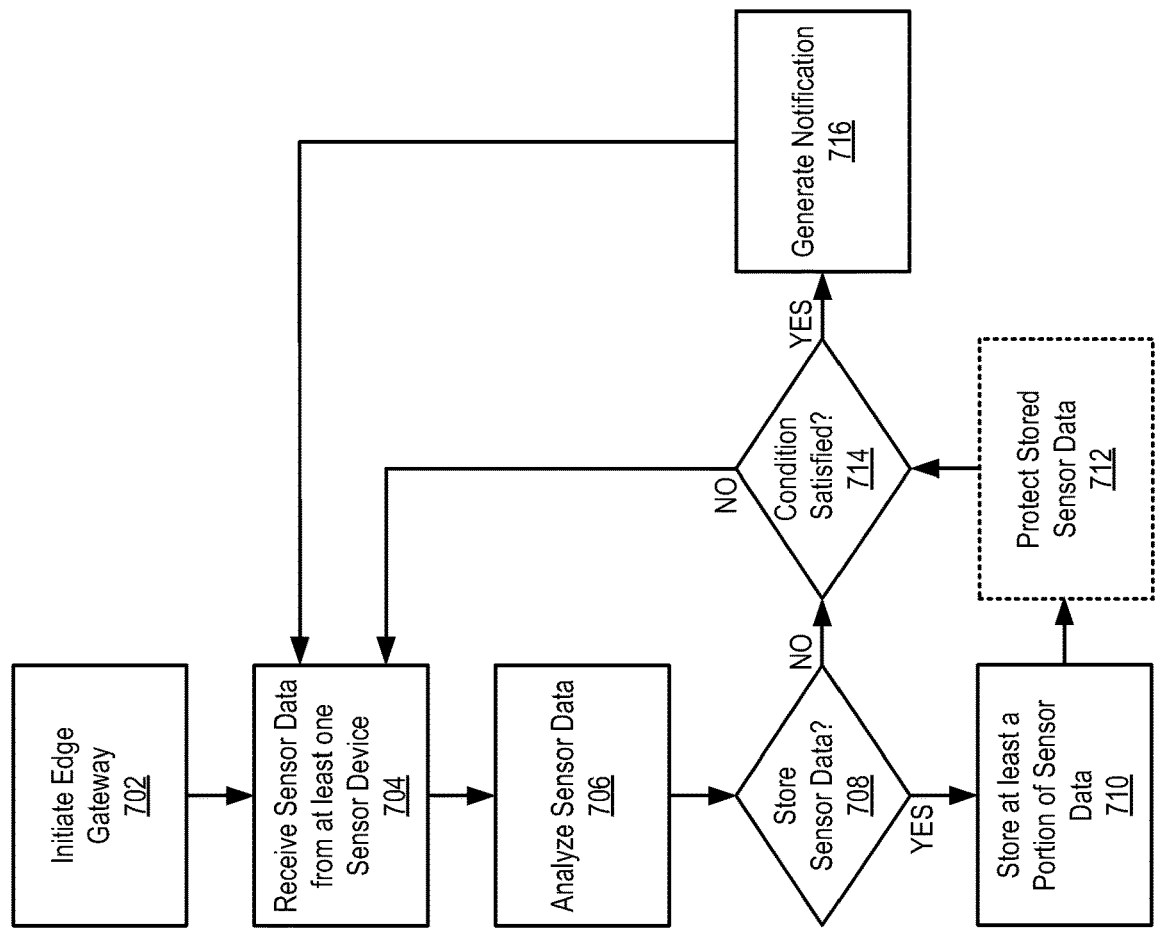
FIG. 7 illustrates example operations for a push operation in accordance with at least one embodiment of the present disclosure.

FIG. 7 illustrates example operations for a push operation in accordance with at least one embodiment of the present disclosure. Example 700 comprises various operations that may occur in an edge gateway (EG) when operating in push mode. In operation 702 at least the EG may be initiated. Sensor data may be received from at least one sensor device in operation 704. In operation 706 the sensor data may be analyzed. Various types of analysis may occur in operation including, for example, analyzing if the sensor data should be stored, analyzing if the sensor data satisfies at least one condition, etc. In at least one embodiment, it may be possible to analyze sensor data received from some or all of the sensor devices in the sensor space. Moreover, a single condition may be analyzed for each sensor device or more than one condition. A determination may then be made in operation 708 as to whether at least a portion of the sensor data received in operation 704 should be stored (e.g., in at least one of a semantic or event-based manner). If in operation 708 is it determined that the sensor data should be stored, then in operation 710 at least a portion of the sensor data may be stored in the EG (e.g., or in a storage device that is at least coupled to the EG). In operation 712 the stored sensor data may optionally be protected (e.g., encrypted, assigned a certain security level corresponding to the users that are allowed to access the stored sensor data, etc.). Operation 712 may be optional in that it may not be necessary to protect the sensor data in all embodiments, implementations, etc. For example, when the sensor data is sensed temperature, motion, proximity, etc. there may not be a need to protect the stored sensor data. However, protection may be beneficial or even necessary if the stored sensor data comprises, for example, at least one image or video capture including people, places, etc. that may be recognizable, sensor data that may indicate how security for a location can be breached (e.g., video capture of access code entry, unmonitored areas in a perimeter of a compound monitored by video surveillance, etc.), etc.

Operation 712, or alternatively a determination not to store sensor data in operation 710, may be followed by a further determination in operation 714 as to whether the at least one condition has been satisfied (e.g., based on the analysis performed in operation 706). If in operation 714 it is determined that the at least one condition has been satisfied, then in operation 716 a notification (e.g., corresponding to the condition that was determined to be satisfied) may be generated. Operation 716, or alternatively a determination in operation 714 that at least one condition has not been satisfied, may be followed by a return to operation 704 to receive further sensor data from at least one sensor device.

Figure 8:
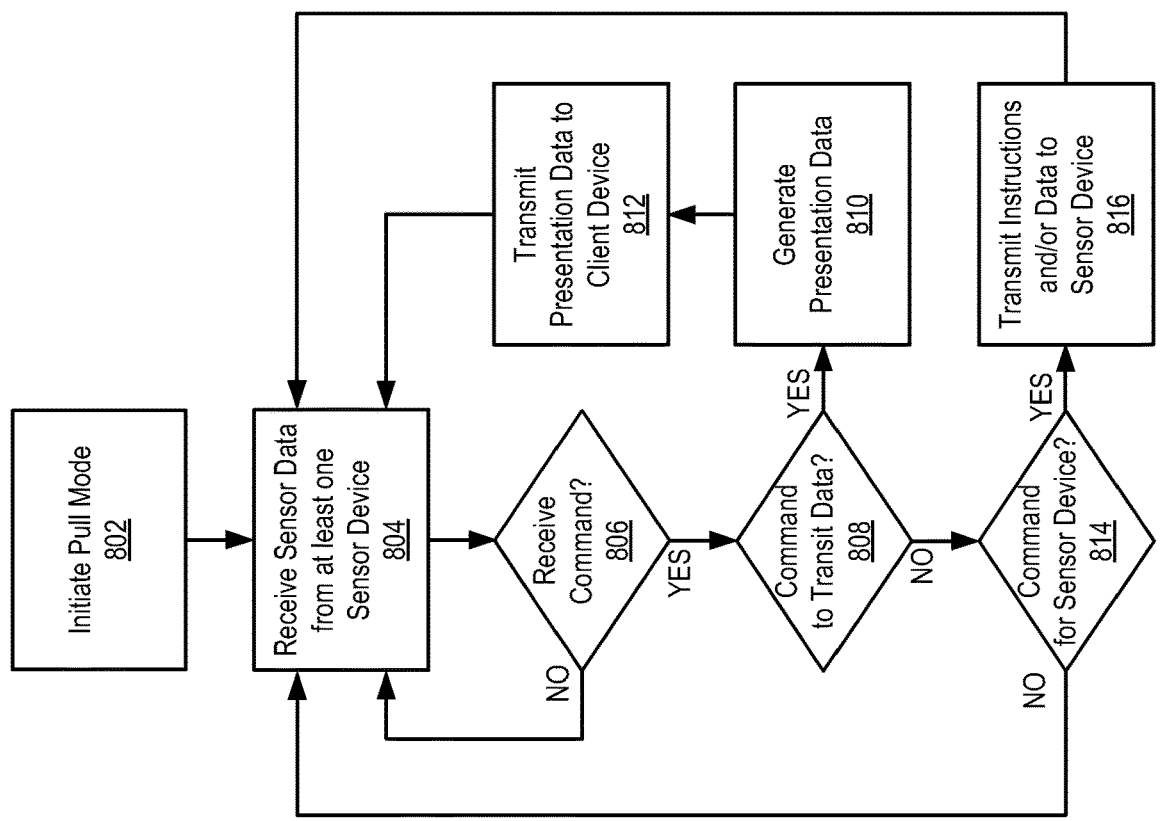
FIG. 8 illustrates example operations for pull operation in accordance with at least one embodiment of the present disclosure.

FIG. 8 illustrates example operations for pull operation in accordance with at least one embodiment of the present disclosure. Example 800 comprises various operations that may occur in an edge gateway (EG) when operating in pull mode. Initially, it is assumed in FIG. 8 that sensor data is being collected by the EG such as described in operations 702 to 710 in FIG. 7. Moreover, it is also assumed that a communication link has been negotiated between the EG and at least one client device via, for example, access coordination resources (ACR). The link permits the EG to transmit information to at least one client device, and vice versa.

Pull mode operation may be initiated in operation 802. Sensor data may continually be received from at least one sensor device in operation 804. A determination may then be made in operation 806 as to whether a command has been received in the EG (e.g., from the DCC). A determination in operation 806 that no command was received may be followed by a return to operation 804 to continue receiving sensor data. Alternatively, if in operation 806 it is determined that a command has been received, then a further determination may be made in operation 808 as to whether the command is requesting data from the EG. If in operation 808 it is determined that the command is requesting data, then in operation 810 presentation data may be generated. Presentation data may simply be sensor data and/or stored sensor data that may be selected (e.g., in at least one of a semantic or event-based manner) for transmission to the DCC, may be newly generated data based on selected sensor data and/or stored sensor data, etc. For example, in at least one embodiment the command received in the EG may specify data that is to be provided based on certain parameters (e.g., data from a certain sensor device, on a certain date, between certain times, at the time an event occurred, etc.), and the presentation may then be selected and/or generated based on the certain parameters from the command. In operation 812 the presentation data may then be transmitted to at least one client device (e.g., DCC) for presentation on the at least one client device. Operation 812 may be followed by a return to operation 804 to continue receiving sensor data from at least one sensor device.

If in operation 808 it is determined that the command is not requesting data, then in operation 814 a further determination may be made as to whether the command is intended for the at least one sensor device coupled to the EG. If in operation 814 it is determined that the command is targeted for at least one sensor device coupled to the EG, then in operation 816 the command may be forwarded to the at least one target sensor device, or alternatively, instructions and/or data may be generated based on the command and then transmitted to the at least one target sensor device. Operation 816, or alternatively a determination that the command was not targeted for at least one sensor device in operation 814, may be followed by a return to operation 804 to continue receiving sensor data from at least one sensor device.

While FIGS. 7 and 8 illustrate operations according to different embodiments, it is to be understood that not all of the operations depicted in FIGS. 7 and 8 are necessary for other embodiments. Indeed, it is fully contemplated herein that in other embodiments of the present disclosure, the operations depicted in FIGS. 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a system to monitor and control sensor devices. A system in an operational environment may act as a gateway for at least one sensor device in the operational environment. In acting as a gateway the system may provide presentation data regarding the at least one sensor device to, and may receive commands from, at least one client device. Interaction between the gateway device and the at least one client device may be configured through interaction with access coordination resources (ACR). In push mode the gateway device may generate a notification when sensor data is determined to satisfy a condition. In pull mode the gateway system may receive commands from the at least one client device to cause the gateway system to generate/provide the presentation data to the at least one client device, provide instructions and/or data to the at least one sensor device, etc.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to monitor and control sensor devices.

According to example 1 there is provided a gateway system. The system may comprise interface circuitry to facilitate interaction with at least one sensor device residing in an operational environment in which the gateway system also resides, intelligence circuitry to analyze real-time sensor data received from the at least one sensor device via the interface circuitry, remote link circuitry to facilitate interaction with at least one client device and core circuitry to control at least the interface circuitry, the intelligence circuitry and the communication circuitry.

Example 2 may include the elements of example 1, wherein the interface circuitry comprises monitor circuitry to request the real-time sensor data from the at least one sensor device.

Example 3 may include the elements of any of examples 1 to 2, wherein the interface circuitry comprises access interface circuitry to access the at least one sensor device via a standard file system.

Example 4 may include the elements of any of examples 1 to 3, wherein the interface circuitry comprises conversion circuitry to convert an inbound communication formulated based on a first protocol used by the at least one sensor device to a second protocol used by the gateway system, and convert an outbound communication formulated based on the second protocol into the first protocol.

Example 5 may include the elements of any of examples 1 to 4, wherein the interface circuitry comprises monitor circuitry to request the real-time sensor data from the at least one sensor device, access interface circuitry to access the at least one sensor device via a standard file system and conversion circuitry to convert an inbound communication formulated based on a first protocol used by the at least one sensor device to a second protocol used by the gateway system, and convert an outbound communication formulated based on the second protocol into the first protocol.

Example 6 may include the elements of any of examples 1 to 5, wherein the intelligence circuitry comprises analytics circuitry to, when the gateway system is operating in a push mode, determine if the real-time sensor data satisfies a condition and alert generation circuitry to trigger generation of at least one notification when the real-time sensor data is determined to satisfy the condition.

Example 7 may include the elements of example 6, wherein the analytics circuitry is to trigger storage circuitry in the core circuitry to store at least a portion of the real-time sensor data as stored sensor data when the real-time sensor data is determined to satisfy the condition.

Example 8 may include the elements of any of examples 1 to 7, wherein the remote link circuitry comprises access coordination resource agent circuitry to interact with access coordination resources that coordinate communications between the gateway system and the at least one client device.

Example 9 may include the elements of any of examples 1 to 8, wherein the core circuitry comprises storage circuitry to store at least a portion of the real-time sensor data as stored sensor data.

Example 10 may include the elements of example 9, wherein the storage circuitry is to store the real-time sensor data in at least one of a semantic or event-based manner.

Example 11 may include the elements of any of examples 9 to 10, wherein the remote link circuitry comprises media presentation agent circuitry to cause presentation data to be generated based on at least one of the real-time sensor data or the stored sensor data, and to cause the presentation data to be transmitted to the at least one client device.

Example 12 may include the elements of example 11, wherein the media presentation agent circuitry is to cause the presentation data to be generated in response to a command received from the at least one client device.

Example 13 may include the elements of example 12, wherein Web Real-Time Communications (WebRTC) is employed to at least receive the command and transmit and transmit the presentation data.

Example 14 may include the elements of example 13, wherein the at least one client device comprises at least one Internet browser through which the presentation data is presented utilizing WebRTC.

Example 15 may include the elements of any of examples 11 to 14, wherein the presentation data is generated based on at least a portion of the stored sensor data selected in at least one of a semantic or event-based manner.

Example 16 may include the elements of any of examples 9 to 15, wherein the core circuitry comprises control and security circuitry to at least protect the stored sensor data.

Example 17 may include the elements of any of examples 1 to 16, wherein the remote link circuitry comprises remote control agent circuitry to receive a command from the at least one client device.

Example 18 may include the elements of example 17, wherein the remote control agent circuitry is to determine a target for the command, and the interface circuitry is to transmit at least one of instructions or data based on the command to the at least one sensor device when the at least one sensor device is determined to be the target.

Example 19 may include the elements of any of examples 1 to 18, wherein the at least one sensor device comprises at least one Internet of Things (IoT) device.

According to example 20 there is provided a system for controlling sensor devices. The system may comprise at least one sensor device in an environment, wherein the at least one sensor device is to generate real time sensor data about a monitored system or the environment, at least one client device to receive presentation data, present the presentation data, support user interaction based on the presentation data and generate commands, access coordination resources including at least one device and at least one gateway device in the environment, wherein the at least one gateway device is to interact with the at least one sensor device to receive the real time sensor data and transmit at least one of instructions or data based on the commands, interact with the access coordination resources to transmit a notification regarding the sensor data and negotiate a link with the at least one client device, interact with the at least one client device through the negotiated link to transmit the presentation data and receive the commands.

Example 21 may include the elements of example 20, wherein the at least one gateway device is to store real time sensor data as stored sensor data and select at least one of the real time sensor data or the stored sensor data to generate the presentation data in at least one of a semantic or event-based manner.

Example 22 may include the elements of any of examples 20 to 21, further comprising network address translation (NAT) firewalls to protect the system and the at least one client device.

Example 23 may include the elements of any of examples 20 to 22, wherein the at least one sensor device comprises at least one an Internet of Things (IoT) device.

According to example 24 there is provided at least one device to operate as an access coordination resource. The at least one device may comprise gateway control circuitry to communicate with at least a gateway device to control the operation of at least the gateway device by at least providing user access controls for configuring the gateway device and direct access management circuitry to communicate with at least one client device to cause the gateway device to present sensor data to the at least one client device and the gateway device to receive commands from the at least one client device.

Example 25 may include the elements of example 24, wherein the at least one device is at least one data server configured to be accessible via at least one network as a cloud resource.

Example 26 may include the elements of any of examples 24 to 25, wherein the gateway control circuitry is to control at least one sensor device coupled to the gateway device.

According to example 27 there is provided a method for operating a gateway device. The method may comprise receiving real-time sensor data in at least one gateway device from at least one sensor device, determining whether the at least one gateway device is to operate in push mode, causing the at least one gateway device to analyze the real-time sensor data from at least one sensor device if it is determined that the gateway device is to operate in push mode, determining whether the at least one gateway device has received a request from the at least one client device to operate in pull mode and causing the at least one gateway device to negotiate a link to the at least one client device utilizing access coordination resources and initiate pull mode operation with the at least one client device if it is determined that the gateway device has received the request.

Example 28 may include the elements of example 27, wherein analyzing the real-time sensor data comprises determining if the real-time sensor data satisfies at least one condition and generating a notification based on a determination that the real-time sensor data satisfies the at least one condition.

Example 29 may include the elements of any of examples 27 to 28, and may further comprise storing at least a portion of the real-time sensor data as stored sensor data.

Example 30 may include the elements of example 29, wherein the real-time sensor data is stored in at least one of a semantic or event-based manner Example 31 may include the elements of any of examples 29 to 30, and may further comprise protecting the stored sensor data.

Example 32 may include the elements of any of examples 29 to 31, wherein initiating pull mode operation may comprise generating presentation data based on at least one of the real-time sensor data or the stored sensor data and transmitting the presentation data to the at least one client device.

Example 33 may include the elements of example 32, wherein the presentation data is generated in response to a command received from the at least one client device.

Example 34 may include the elements of example 33, wherein Web Real-Time Communications (WebRTC) is employed to at least receive the command and transmit and transmit the presentation data.

Example 35 may include the elements of any of examples 32 to 34, wherein the presentation data is generated based on at least a portion of the stored sensor data selected in at least one of a semantic or event-based manner.

Example 36 may include the elements of any of examples 27 to 35, and may further comprise receiving a command from the at least one client device, determining a target for the command and transmitting at least one of instructions or data based on the command data to the at least one sensor device when the at least one sensor device is determined to be the target of the command.

According to example 37 there is provided a system including at least one device, the system being arranged to perform the method of any of the above examples 27 to 36.

According to example 38 there is provided a chipset arranged to perform the method of any of the above examples 27 to 36.

According to example 39 there is provided at least one machine readable medium comprising a plurality of instructions that, in response to be being executed on a computing device, cause the computing device to carry out the method according to any of the above examples 27 to 36.

According to example 40 there is provided at least one device capable of operating as a gateway device, the at least one device being arranged to perform the method of any of the above examples 27 to 36.

According to example 41 there is provided a system for operating a gateway device. The system may comprise means for receiving real-time sensor data in at least one gateway device from at least one sensor device, means for determining whether the at least one gateway device is to operate in push mode, means for causing the at least one gateway device to analyze the real-time sensor data from at least one sensor device if it is determined that the gateway device is to operate in push mode, means for determining whether the at least one gateway device has received a request from the at least one client device to operate in pull mode and means for causing the at least one gateway device to negotiate a link to the at least one client device utilizing access coordination resources and initiate pull mode operation with the at least one client device if it is determined that the gateway device has received the request.

Example 42 may include the elements of example 41, wherein the means for analyzing the real-time sensor data may comprise means for determining if the real-time sensor data satisfies at least one condition and means for generating a notification based on a determination that the real-time sensor data satisfies the at least one condition.

Example 43 may include the elements of any of examples 41 to 42, and may further comprise means for storing at least a portion of the real-time sensor data as stored sensor data.

Example 44 may include the elements of example 43, wherein the real-time sensor data is stored in at least one of a semantic or event-based manner.

Example 45 may include the elements of any of examples 43 to 44, and may further comprise means for protecting the stored sensor data.

Example 46 may include the elements of any of examples 43 to 45, wherein the means for initiating pull mode operation comprise means for generating presentation data based on at least one of the real-time sensor data or the stored sensor data and means for transmitting the presentation data to the at least one client device.

Example 47 may include the elements of example 46, wherein the presentation data is generated in response to a command received from the at least one client device.

Example 48 may include the elements of example 47, wherein Web Real-Time Communications (WebRTC) is employed to at least receive the command and transmit and transmit the presentation data.

Example 49 may include the elements of any of examples 46 to 48, wherein the presentation data is generated based on at least a portion of the stored sensor data selected in at least one of a semantic or event-based manner.

Example 50 may include the elements of any of examples 41 to 49, and may further comprise means for receiving a command from the at least one client device, means for determining a target for the command and means for transmitting at least one of instructions or data based on the command data to the at least one sensor device when the at least one sensor device is determined to be the target of the command.

According to example 51 there is provided at least one machine-readable storage medium. The storage medium may have stored thereon, individually or in combination, instructions for operating a gateway device that, when executed by one or more processors, cause the one or more processors to receive real-time sensor data in at least one gateway device from at least one sensor device, determine whether the at least one gateway device is to operate in push mode, cause the at least one gateway device to analyze the real-time sensor data from at least one sensor device if it is determined that the gateway device is to operate in push mode, determine whether the at least one gateway device has received a request from the at least one client device to operate in pull mode and cause the at least one gateway device to negotiate a link to the at least one client device utilizing access coordination resources and initiate pull mode operation with the at least one client device if it is determined that the gateway device has received the request.

Example 52 may include the elements of example 51, wherein the instructions to analyze the real-time sensor data may comprise instructions to determine if the real-time sensor data satisfies at least one condition and generate a notification based on a determination that the real-time sensor data satisfies the at least one condition.

Example 53 may include the elements of any of examples 51 to 52, and may further comprise instructions that, when executed by one or more processors, cause the one or more processors to store at least a portion of the real-time sensor data as stored sensor data.

Example 54 may include the elements of example 53, wherein the real-time sensor data is stored in at least one of a semantic or event-based manner.

Example 55 may include the elements of any of examples 53 to 54, and may further comprise instructions that, when executed by one or more processors, cause the one or more processors to protect the stored sensor data.

Example 56 may include the elements of any of examples 53 to 55, wherein the instructions to initiate pull mode operation may comprise instructions to generate presentation data based on at least one of the real-time sensor data or the stored sensor data and transmit the presentation data to the at least one client device.

Example 57 may include the elements of example 56, wherein the presentation data is generated in response to a command received from the at least one client device.

Example 58 may include the elements of example 57, wherein Web Real-Time Communications (WebRTC) is employed to at least receive the command and transmit and transmit the presentation data.

Example 59 may include the elements of any of examples 56 to 58, wherein the presentation data is generated based on at least a portion of the stored sensor data selected in at least one of a semantic or event-based manner.

Example 60 may include the elements of any of examples 51 to 59, and may further comprise instructions that, when executed by one or more processors, cause the one or more processors to receive a command from the at least one client device determine a target for the command and transmit at least one of instructions or data based on the command data to the at least one sensor device when the at least one sensor device is determined to be the target of the command.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A gateway system selectively operable in at least one of: a pull notification mode or a push notification mode, the gateway system comprising:
    interface circuitry to facilitate interaction with each of a plurality of sensor devices residing in an operational environment in which the gateway system also resides;
    intelligence circuitry to:
        analyze real-time sensor data received from a first sensor device via the interface circuitry to detect an occurrence of an event using the analyzed real-time sensor data received from the first sensor device;
        determine whether the event occurrence fulfills one or more defined alert criteria; and
        generate an alert message responsive to a determination that the event occurrence fulfills the one or more defined alert criteria;
        store sensor data generated by a second sensor device in memory circuitry, the sensor data generated by the second sensor device contemporaneous with the event occurrence detected using the real-time sensor data received from the first sensor device;
    remote link circuitry to determine the notification mode of the gateway system:
        responsive to a determination that the gateway system is in the pull notification mode,
        selectively communicate to the client device the alert message and at least a portion of the sensor data generated by the second sensor device contemporaneous with the event occurrence responsive to a request received from a client device; and
        responsive to a determination that the gateway system is in the push notification mode, selectively communicate to the client device the alert message and at least a portion of the sensor data generated by the second sensor device contemporaneous with the event occurrence responsive to generation of the alert message; and
    core circuitry to control at least the interface circuitry, the intelligence circuitry and the remote link circuitry.

2. The system of claim 1, wherein the interface circuitry comprises:
    monitor circuitry to request the real-time sensor data from each of the plurality of sensor devices;
    access interface circuitry to access each of the plurality of sensor devices via a standard file system; and
    conversion circuitry to convert an inbound communication formulated based on a first protocol used by each of the plurality of sensor devices to a second protocol used by the gateway system, and convert an outbound communication formulated based on the second protocol into the first protocol.

3. The system of claim 1, wherein the intelligence circuitry comprises analytics circuitry to, when the gateway system is operating in the push notification mode, determine if the real-time sensor data satisfies a condition and alert generation circuitry to trigger generation of at least one notification when the real-time sensor data is determined to satisfy the condition.

4. The system of claim 1, wherein the remote link circuitry comprises access coordination resource agent circuitry to interact with access coordination resources that coordinate communications between the gateway system and the at least one client device.

5. The system of claim 1, wherein the core circuitry comprises storage circuitry to store at least a portion of the real-time sensor data as stored sensor data.

6. The system of claim 5, wherein the storage circuitry is to store the real-time sensor data in at least one of a semantic or event-based manner.

7. The system of claim 5, wherein the remote link circuitry comprises media presentation agent circuitry to cause presentation data to be generated based on at least one of the real-time sensor data or the stored sensor data, and to cause the presentation data to be transmitted to the at least one client device.

8. The system of claim 7, wherein the presentation data is generated based on at least a portion of the stored sensor data selected in at least one of a semantic or event-based manner.

9. The system of claim 5, wherein the core circuitry comprises control and security circuitry to at least protect the stored sensor data.

10. The system of claim 1, wherein the remote link circuitry comprises remote control agent circuitry to receive a command from the at least one client device.

11. The system of claim 10, wherein the remote control agent circuitry is to determine a target for the command, and the interface circuitry is to transmit at least one of instructions or data based on the command to the at least one sensor device when the at least one sensor device is determined to be the target.

12. A system for controlling sensor devices, comprising:
    a plurality of sensor devices in an environment, wherein each of the plurality of sensor devices is to generate real time sensor data about a monitored system or the environment;

at least one client device to receive presentation data, present the presentation data, support user interaction based on the presentation data and generate commands;

at least one gateway device disposed in the environment, the at least one gateway device to:
  interact with a first sensor device included in the plurality of sensor devices to receive the real time sensor data from the first sensor device and transmit at least one of instructions or data based on the commands;
  analyze real-time sensor data received from a first sensor device to detect an occurrence of an event using the analyzed real-time sensor data received from the first sensor device;
  determine whether the event occurrence fulfills one or more defined alert criteria;
  generate an alert message responsive to a determination that the event occurrence fulfills the one or more defined alert criteria;
  store sensor data generated by a second sensor device in memory circuitry, the sensor data generated by the second sensor device contemporaneous with the event occurrence detected using the real-time sensor data received from the first sensor device;
  determine the notification mode of the at least one gateway device:
    responsive to a determination that the at least one gateway device is in the pull notification mode,
    interact with the access coordination resources to:
      negotiate a link with the at least one client device; and
      selectively transmit to the client device the alert message and at least a portion of the sensor data generated by the second sensor device contemporaneous with the event occurrence responsive to a request received from a client device;
    responsive to a determination that the at least one gateway device is in the push notification mode:
      selectively communicate to the client device the alert message and at least a portion of the sensor data generated by the second sensor device contemporaneous with the event occurrence responsive to generation of the alert message.

13. The system of claim 12, wherein the at least one gateway device is to store real time sensor data as stored sensor data and select at least one of the real time sensor data or the stored sensor data to generate the presentation data in at least one of a semantic or event-based manner.

14. A method for operating a gateway device, comprising:
  receiving, by at least one gateway device selectively operable in at least one of: a pull notification mode or a push notification mode, real-time sensor data from at least one of a plurality of sensor devices;
  determining whether the at least one gateway device is operating in the push notification mode or the pull notification mode;
  causing the at least one gateway device to analyze the real-time sensor data received from a first sensor device to detect an occurrence of an event using the analyzed real-time sensor data;
  determining whether the event occurrence fulfills one or more defined alert criteria;
  generating an alert message responsive to a determination that the event occurrence fulfills the one or more defined alert criteria;
  storing sensor data generated by a second sensor device in memory circuitry, the sensor data generated by the second sensor device contemporaneous with the event occurrence detected using the sensor data received from the first sensor device;
  responsive to a determination that the at least one gateway device is in the pull notification mode,
    selectively communicating to the client device the alert message and at least a portion of the sensor data generated by the second sensor device contemporaneous with the event occurrence responsive to a request received from a client device; and
  responsive to a determination that the at least one gateway device is in the push notification mode,
    selectively communicating to the client device the alert message and at least a portion of the sensor data generated by the second sensor device contemporaneous with the event occurrence responsive to generation of the alert message.

15. The method of claim 14, wherein analyzing the real-time sensor data comprises:
  determining if the real-time sensor data satisfies at least one condition; and
  generating a notification based on a determination that the real-time sensor data satisfies the at least one condition.

16. The method of claim 14, further comprising:
  storing at least a portion of the real-time sensor data as stored sensor data.

17. The method of claim 16, further comprising:
  protecting the stored sensor data.

18. The method of claim 16, wherein initiating pull mode operation comprises:
  generating presentation data based on at least one of the real-time sensor data or the stored sensor data; and
  transmitting the presentation data to the at least one client device.

19. The method of claim 14, further comprising:
  receiving a command from the at least one client device;
  determining a target for the command; and
  transmitting at least one of instructions or data based on the command data to the at least one sensor device when the at least one sensor device is determined to be the target of the command.

20. At least one non-transitory machine-readable storage medium having stored thereon, individually or in combination, instructions for operating a gateway device that, when executed by one or more processors, cause the one or more processors to:
  cause at least one gateway device selectively operable in at least one of: a pull notification mode or a push notification mode to receive real-time sensor data from at least one of a plurality of sensor devices;
  determine whether the at least one gateway device is to operate in the push notification mode or the pull notification mode;
  cause the at least one gateway device to analyze the real-time sensor data received from a first sensor device included in the plurality of sensor devices to detect an occurrence of an event using the analyzed real-time sensor data;
  determine whether the event occurrence fulfills one or more defined alert criteria;
  generate an alert message responsive to a determination that the event occurrence fulfills the one or more defined alert criteria;
  store sensor data generated by a second sensor device in memory circuitry, the sensor data generated by the second sensor device contemporaneous with the event occurrence detected using the sensor data received from the first sensor device;

responsive to a determination that the at least one gateway device is in the pull notification mode, selectively communicate to the client device the alert message and at least a portion of the sensor data generated by the second sensor device contemporaneous with the event occurrence responsive to a request received from a client device; and responsive to a determination that the at least one gateway device is in the push notification mode:

selectively communicate to the client device the alert message and at least a portion of the sensor data generated by the second sensor device contemporaneous with the event occurrence responsive to generation of the alert message.

21. The storage medium of claim 20, wherein the instructions to analyze the real-time sensor data comprise instructions to:

determine if the real-time sensor data satisfies at least one condition; and generate a notification based on a determination that the real-time sensor data satisfies the at least one condition.

22. The storage medium of claim 20, further comprising instructions that, when executed by one or more processors, cause the one or more processors to:

store at least a portion of the real-time sensor data as stored sensor data.

23. The storage medium of claim 22, further comprising instructions that, when executed by one or more processors, cause the one or more processors to:

protect the stored sensor data.

24. The storage medium of claim 22, wherein the instructions to initiate pull mode operation comprise instructions to:

generate presentation data based on at least one of the real-time sensor data or the stored sensor data; and transmit the presentation data to the at least one client device.

25. The storage medium of claim 20, further comprising instructions that, when executed by one or more processors, cause the one or more processors to:

receive a command from the at least one client device;

determine a target for the command; and transmit at least one of instructions or data based on the command data to the at least one sensor device when the at least one sensor device is determined to be the target of the command.

* * * * *